United States Patent
Song et al.

(10) Patent No.: US 9,229,258 B2
(45) Date of Patent: Jan. 5, 2016

(54) LIQUID CRYSTAL MOTHER PANEL AND MANUFACTURING METHOD

(71) Applicant: SHENZHEN CHINA STAR OPTOELECTRONICS TECHNOLOGY CO., LTD., Shenzhen, Guangdong (CN)

(72) Inventors: Tao Song, Guangdong (CN); Tao Ding, Guangdong (CN); Tao Ma, Guangdong (CN); Guodong Zhao, Guangdong (CN); Ming Liu, Guangdong (CN); Yijun Liu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 319 days.

(21) Appl. No.: 13/813,943
(22) PCT Filed: Dec. 5, 2012
(86) PCT No.: PCT/CN2012/085902
§ 371 (c)(1),
(2) Date: Feb. 2, 2013
(87) PCT Pub. No.: WO2014/067205
PCT Pub. Date: May 8, 2014

(65) Prior Publication Data
US 2014/0125937 A1 May 8, 2014

(30) Foreign Application Priority Data
Nov. 5, 2012 (CN) .......................... 2012 1 0436169

(51) Int. Cl.
*G02F 1/1339* (2006.01)
*G02F 1/1333* (2006.01)
*G02F 1/13* (2006.01)

(52) U.S. Cl.
CPC ........ *G02F 1/133351* (2013.01); *G02F 1/1303* (2013.01); *G02F 1/13394* (2013.01); *G02F 2001/13398* (2013.01); *G02F 2201/503* (2013.01)

(58) Field of Classification Search
CPC .................... G02F 1/133351; G02F 2201/503; G02F 2001/13398; G02F 1/13394
USPC ......... 349/153, 155, 156, 158, 149, 151, 187; 156/250; 438/30; 445/25
See application file for complete search history.

(56) References Cited

U.S. PATENT DOCUMENTS

| | | | | |
|---|---|---|---|---|
| 6,312,546 | B1 * | 11/2001 | Bannister et al. | 156/230 |
| 2012/0081651 | A1 * | 4/2012 | Misaki | 349/153 |
| 2012/0268708 | A1 * | 10/2012 | Chida | 349/153 |

FOREIGN PATENT DOCUMENTS

CN 102749731 10/2012

OTHER PUBLICATIONS

International Search Report issued for PCT application No. PCT/CN2012/085902 by the State Intellectual Property Office of China.

*Primary Examiner* — Edward Glick
*Assistant Examiner* — Tai Duong

(57) ABSTRACT

A to-be-cut liquid crystal mother panel includes a TFT mother substrate forming at least one voltage-applying area onto which an external voltage is applied, a CF mother substrate arranged corresponding to the TFT mother substrate, and a pressure-reduction member located between the CF mother substrate and the TFT mother substrate; the pressure-reduction member corresponds to the voltage-applying area for reducing an adsorptive force between the voltage-applying area and an end portion of the CF mother substrate corresponding to the voltage-applying area. The pressure-reduction member increases the surface roughness of the end portion, avoids a vacuum state formed between the end portion and the voltage-applying area, reduces the adsorptive force between the end portion and the voltage-applying area, and allows the splitting device to separate the end portion from the TFT mother substrate easily after the liquid crystal mother panel is cut.

13 Claims, 5 Drawing Sheets

FIG. 1 <RELATED ART>
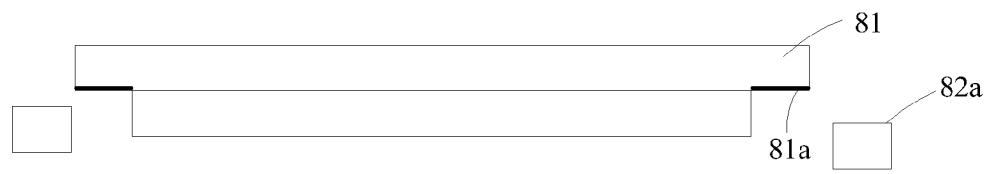
FIG. 2 <RELATED ART>
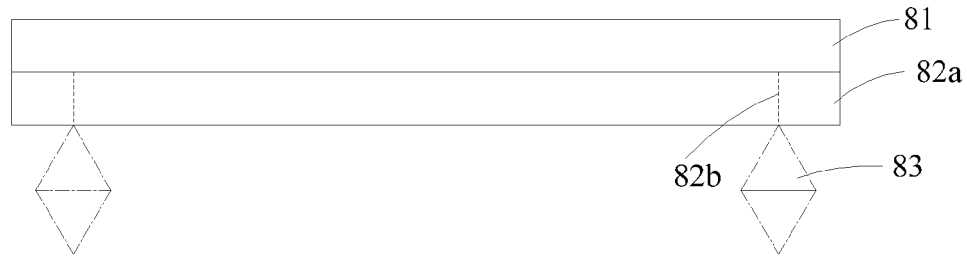
FIG. 3 <RELATED ART>
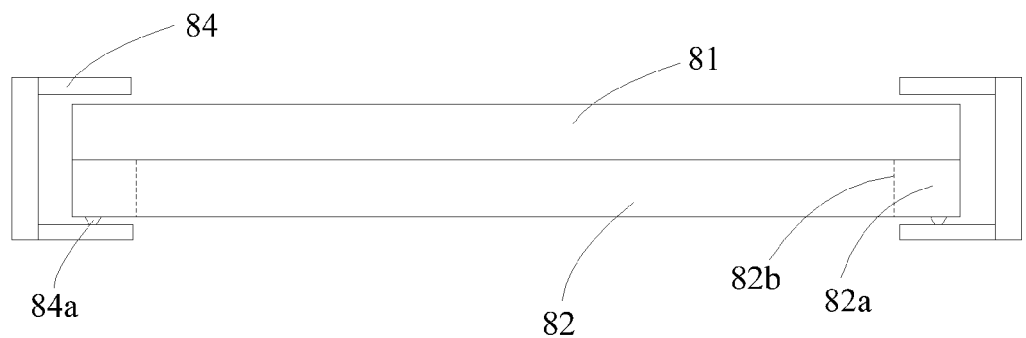
FIG. 4 <RELATED ART>

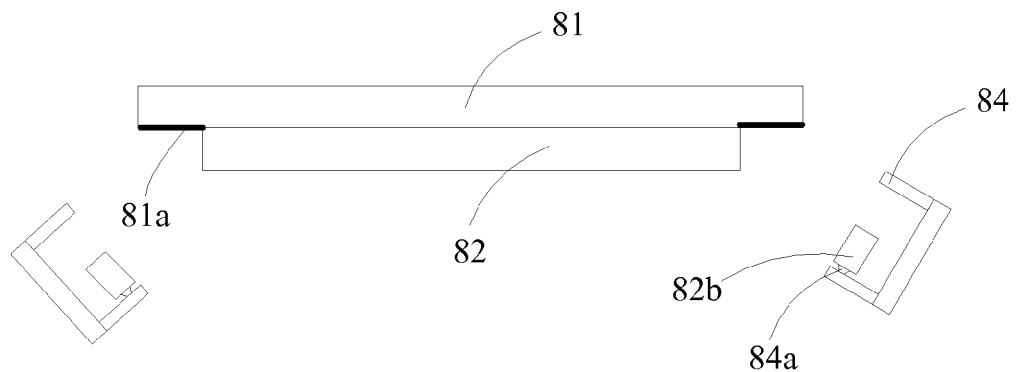
FIG. 5 <RELATED ART>
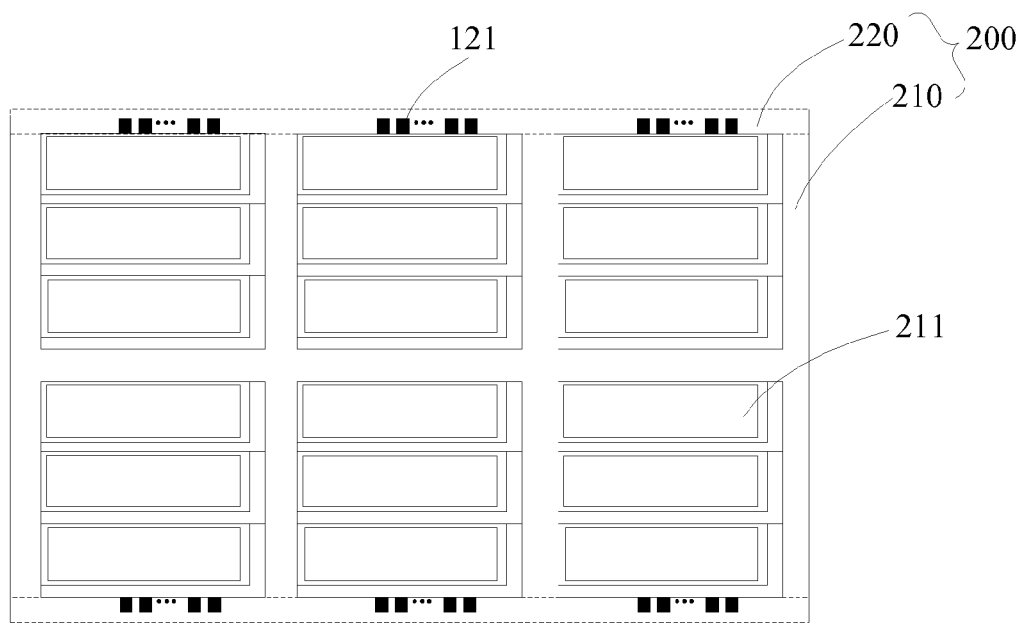
FIG. 6

LIQUID CRYSTAL MOTHER PANEL AND MANUFACTURING METHOD

BACKGROUND

1. Technical Field

The present disclosure relates to manufacturing technologies of liquid crystal panels and, particularly, to a to-be-cut liquid crystal mother panel and a manufacturing method thereof.

2. Description of Related Art

A liquid crystal panels is the main component of a liquid crystal display. In the manufacturing process of the liquid crystal panel, a large liquid crystal mother panel is cut according to sizes of final products to form a number of liquid crystal panel units. As shown in FIG. 1, a liquid crystal mother panel 80 includes a TFT mother substrate 81 and a CF mother substrate 82 bonded to the TFT mother substrate 81. The TFT mother substrate 81 includes a glass substrate and a first main area 81a and a voltage-applying area 81b formed on the glass substrate. The CF mother substrate 82 includes a glass substrate and a second main area 82a and an end portion 82b formed on the glass substrate. The second main area 82a corresponds to the first main area 81a and is configured with a number of color filter substrates. The end portion 82b is located outside the second main area 82a and corresponds to the voltage-applying area 81b.

During the automatic alignment process of liquid crystals, a voltage is applied onto the voltage-applying area 81b on the TFT mother substrate. Since the TFT mother substrate and the CF mother substrate have been bonded together, the mother panel 80 has to be cut so that the end portion 82b of the CF mother substrate can be removed to reveal the voltage-applying area 81b of the TFT mother substrate 81, as shown in FIG. 2.

Referring to FIG. 3, at present, a cutting machine 83 is generally used to cut the mother panel 80. The cutting machine at first forms a crack of certain depth on a surface of the glass substrate of the CF mother substrate 82. The crack is then enlarged in two ways to separate the end portion 82b. In a first way, a splitting device is used for hitting a side of the mother panel opposite to the side where is crack is located to enlarge the crack until the end portion 82b is separated completely. In a second way, as shown in FIGS. 4 and 5, a splitting device 84 is used for clamping the end portion 82b and twisting the end portion 82b towards a direction at which the crack is enlarged over a certain angle. During the process, the crack is enlarged until the end portion 82b is completely separated. A vacuum suction pad 84a of the splitting device sucks the separated end portion 82b to remove the end portion 82b from the TFT mother substrate 81, thereby revealing the voltage-applying area 81b on the TFT mother substrate 81.

On the other hand, during the process of bonding the CF mother substrate 82 to the TFT mother substrate 81, to large liquid crystal panels, since the areas of the TFT mother substrate 81 and the CF mother substrate 82 are respectively relatively great and the surfaces of the voltage-applying area and the end portion 82b are relatively smooth, therefore, the air between the end portion 82b and the voltage-applying area 81b are almost squeezed out to form a vacuum state therebetween. At this state, the adsorptive force generated between the end portion 82a and the voltage-applying area is relatively great, which prevents the splitting device 84 from separating the end portion 82b somehow no matter in which way mentioned above the end portion 82b is separated and further reduces the cutting efficiency and cutting success rate of cutting the mother panel 80.

SUMMARY

One aspect of the present disclosure is to provide a liquid crystal mother panel which improves the cutting efficiency of the liquid crystal mother panel by allowing an end portion of a CF mother substrate corresponding to a voltage-applying area of a TFT mother substrate to be separated easily.

The present disclosure provides a to-be-cut liquid crystal mother panel, including:

a TFT mother substrate forming at least one voltage-applying area onto which an external voltage is applied;

a CF mother substrate arranged corresponding to the TFT mother substrate; and a pressure-reduction member located between the CF mother substrate and the TFT mother substrate, the pressure-reduction member corresponding to the voltage-applying area for reducing an adsorptive force generated between the voltage-applying area and an end portion of the CF mother substrate corresponding to the voltage-applying area.

Preferably, the pressure-reduction member is arranged on one side of the CF mother substrate facing the TFT mother substrate and is located on the end portion of the CF mother substrate corresponding to the voltage-applying area.

Preferably, the pressure-reduction member includes at least one protrusion spaced apart from each other.

Preferably, each of the at least one protrusion is a photo spacer.

Preferably, a height of the photo spacer ranges from 3 um to 5 um.

Preferably, the photo spacer is formed in the manufacturing process of photo spacers of the CF mother substrate.

The present disclosure further provides a manufacturing method of a to-be-cut liquid crystal mother panel, including:

providing a TFT mother substrate having a first main area and a voltage-applying area and processing the first main area and the voltage-applying area to form a plurality of thin film transistor substrates on the first main area and a plurality of terminals for external electrical connection on the voltage-applying area;

providing a CF mother substrate having a second main area and an end portion and processing the second main area and the end portion to form a plurality of color filter substrates on the second main area and a pressure-reduction member on a surface of the end portion for reducing an adsorptive force generated between the voltage-applying area and the end portion; and bonding the TFT mother substrate and the CF mother substrate and pouring liquid crystals into a space defined between the TFT mother substrate and the CF mother substrate.

Preferably, the step of providing a CF mother substrate having a second main area and an end portion and processing the second main area and the end portion to form a plurality of color filter substrates on the second main area and a pressure-reduction member on a surface of the end portion for reducing an adsorptive force generated between the voltage-applying area and the end portion includes:

providing a CF mother substrate having a second main area and an end portion and coating a black film on a surface of the CF mother substrate;

exposing and developing the black film to form a black matrix and photo spacers on a surface of the second main area and form photo spacers on a surface of the end portion;

exposing the black thin film on the second main area further using a photomask to form color resist areas; and pouring color ink into the color resist areas to form a plurality of color filter layers and further to form a plurality of color filter substrates on the second main area.

Preferably, a height of each photo spacer ranges from 3 um to 5 um.

Preferably, a density of the photo spacers on the end portion is equal to that of the photo spacers on the second main area.

The present disclosure yet further provides another to-be-cut liquid crystal mother panel, including:

a TFT mother substrate forming at least one voltage-applying area onto which an external voltage is applied;

a CF mother substrate arranged corresponding to the TFT mother substrate, the CF mother substrate having an end portion corresponding to the voltage-applying area; and a pressure-reduction member arranged on the end portion and being formed in the manufacturing process of the CF mother substrate for reducing an adsorptive force generated between the voltage-applying area and the end portion.

Preferably, a height of the pressure-reduction member ranges from 3 um to 5 um. Preferably, the pressure-reduction member includes a plurality of photo spacers.

The pressure-reduction member of the liquid crystal mother panel of the present disclosure is located between the end portion and the voltage-applying area to increase the surface roughness of the end portion, which avoids a vacuum state formed between the end portion and the voltage-applying area, reduces the adsorptive force between the end portion and the voltage-applying area, allows the splitting device to separate the end portion from the TFT mother substrate easily after the liquid crystal mother panel is cut, and improves the cutting efficiency and cutting success rate of the liquid crystal mother panel.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

FIG. 1 is a schematic view of a to-be-cut liquid crystal mother panel;

FIG. 2 is a schematic view showing that an end portion of a CF mother substrate of the mother panel and a voltage-applying area of a TFT mother substrate of the mother panel are apart away from each other;

FIG. 3 is a schematic view showing that a cutting machine is used for forming a crack on the end portion of the CF mother substrate which corresponds to the voltage-applying area;

FIG. 4 is a schematic view showing that a splitting device is separating the end portion of the CF mother substrate corresponding to the voltage-applying area;

FIG. 5 is a schematic view showing that the splitting device removes the end portion of the CF mother substrate from the TFT mother substrate;

FIG. 6 is a top view of a to-be-cut mother liquid crystal mother panel in accordance with an embodiment of the present disclosure;

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 7:
FIG. 7 is a side view of the mother panel of the FIG. 6.

Referring to FIGS. 6 and 7, in which FIG. 6 is a top view of a to-be-cut liquid crystal mother panel 10 in accordance with an embodiment of the present disclosure and FIG. 7 is a side view of the mother panel 10. In the embodiment, the mother panel 10 includes a TFT mother substrate 100, a CF mother substrate 200 disposed corresponding to the TFT mother substrate 100, and a pressure-reduction member 300 located between the TFT mother substrate 100 and the CF mother substrate 200. After the mother panel 10 is manufactured, the mother panel 10 is cut according to sizes of final products to form a number of liquid crystal units.

In the embodiment, the TFT mother substrate 100 includes a first main area 110 and a voltage-applying area 120. The first main area 110 forms a number of thin film transistor substrates which are arranged as a matrix. Each thin film transistor substrate includes a displaying area and a terminal area. The displaying area is used for driving the liquid crystal layer to allow for displays of images and the terminal area is connected to external circuits. The terminal areas of the thin film transistor substrates in the same row respectively correspond to the same sides of the displaying areas. The terminal areas of the thin film transistor substrates in two adjacent rows are opposite to each other. The voltage-applying area 120 is located outside the first main area 110 and is configured with a number of terminals 121 onto which the voltage is applied for realizing alignments of the liquid crystals.

The CF mother substrate 200 includes a second main area 210 and an end portion 220. The second main area 210 corresponds to the first main area 110 and includes a number of color filter substrates 211. Each color filter substrate 211 forms a black matrix, photo spacers, and a color filter layer formed in the black matrix. The color filter substrates 211 respectively correspond to the thin film transistor substrates on the first main area 110 to form a number of liquid crystal cells. The end portion 220 is located outside the second main area 210 and corresponds to the voltage-applying area 120 of the TFT mother substrate 100. That is, the number of the end portion 220 is equal to that of the voltage-supplying area 120 of the TFT mother substrate 100.

The pressure-reduction member 300 is located between the TFT mother substrate 100 and the CF mother substrate 200. Specifically, the pressure-reduction member 300 is located between the voltage-applying area 120 of the TFT mother substrate 100 and the end portion 220 of the CF mother substrate for avoiding a vacuum state formed between the end portion 220 and the voltage-applying area 120 after the TFT mother substrate 100 and the CF mother substrate 200 are bonded together and further reduces the adsorptive force between the end portion 220 and the voltage-applying area 120. This allows the end portion 220 to be separated easily after the liquid crystal mother panel 10 is cut so that the voltage can be applied onto the terminals on the voltage-applying area 120 to realize the alignment of the liquid crystals.

Figure 8:
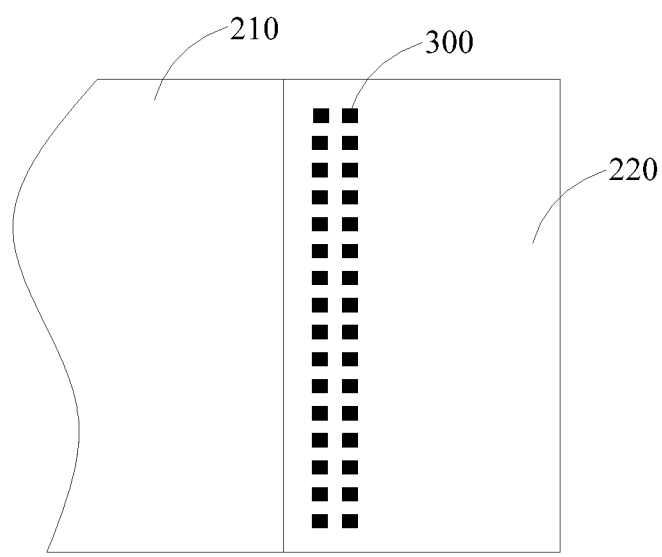
FIG. 8 is a schematic view of a CF mother substrate of the mother panel of FIG. 6.

In some embodiments, the pressure-reduction member 300 includes a number of protrusions which have certain heights and are located between the end portion 220 and the voltage-applying area 120. Being located between the end portion 220 and the voltage applying area 120, the protrusions increase a surface roughness of the end portion 220 and prevent surfaces of the end portion 220 and voltage-applying area 120 from contacting each other completely, thereby avoiding a vacuum state formed therebetween. Referring to FIG. 8, in the embodiment, the protrusions are photo spacers regularly arranged on the surface of the end portion 220. The height of each photo spacer ranges from 3 um to 5 um. The photo spacers are simultaneously formed in the manufacturing process of the photo spacers on each color filter substrate on the second main area 210 of the CF mother substrate 220. Thus, the density of the photo spacer on the surface of the end portion 220 is equal to that of the photo spacers on the second main area 210. The photo spacers increase the surface roughness of the end portion 220, which prevents the air between end portion 220 and voltage-applying area 120 from being squeezed out completely after the TFT mother substrate 100 and the CF mother substrate 200 are bonded together, thereby avoiding a vacuum state formed therebetween. At this state, the end portion 220 can be separated from the TFT mother substrate 100 easily by using the cutting machine and the splitting device.

It is understood that the pressure-reduction member 300 is not limited to the embodiment. In other embodiments, the pressure-reduction member 300 can be particles which, for example, have appropriate mechanical strengths, do not pollute liquid crystal molecules, and have good heat-resistance and corrosion-resistance, or can be a plate-shaped object with a surface having a certain roughness.

The pressure-reduction member 300 of the liquid crystal mother panel provided in the present disclosure is located between the end portion 220 and the voltage-applying area 120 to increase the surface roughness of the end portion 220, which avoids a vacuum state formed between the end portion 220 and the voltage-applying area 120 due to smooth surfaces of the end portion 220 and the voltage-applying area 120 and reduces the adsorptive force between the end portion 220 and the voltage-applying area 120. This allows the splitting device to separate the end portion 220 from the TFT mother substrate 100 easily, thereby improving the cutting success rate and cutting efficiency of the liquid crystal mother panel 10. Additionally, since the pressure-reduction member 300 is simultaneously formed in the manufacturing process of the photo spacers on the second main area 210 of the CF mother substrate 200, thus, the objective of the present disclosure to be achieved at low cost.

Figure 9:
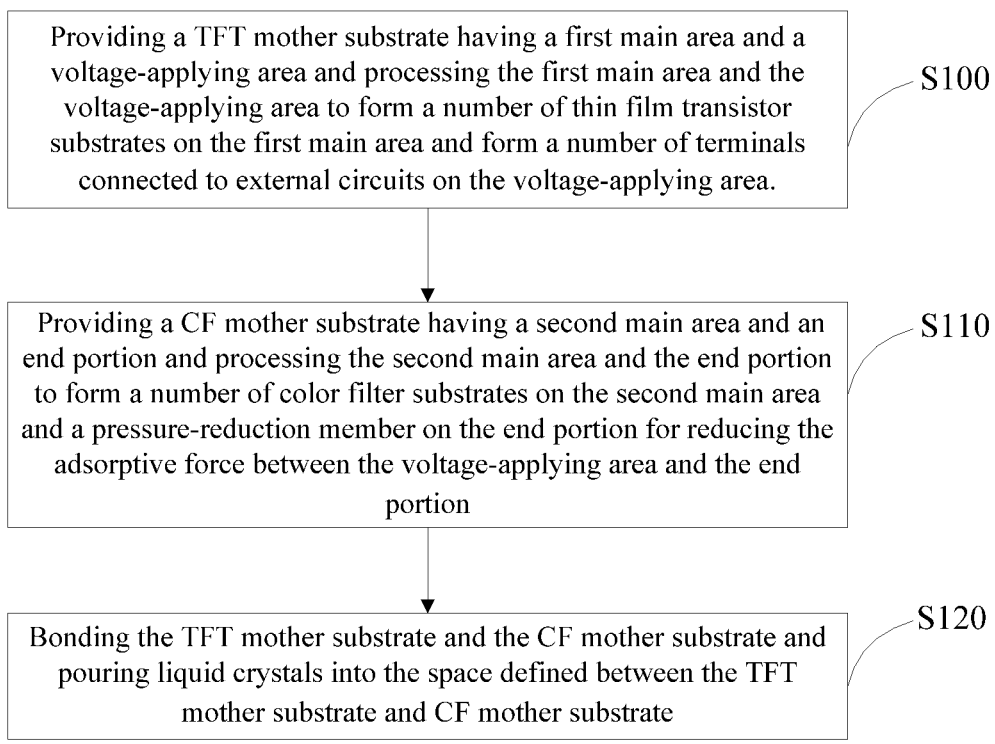
FIG. 9 is a flow chart of a manufacturing method of the mother panel of FIG. 6 in accordance with an embodiment of the present disclosure.

Referring to FIG. 9, a manufacturing method of the above to-be-cut liquid crystal mother panel is provided in the present disclosure. Manufactured in the manufacturing method, the adsorptive force between the TFT mother substrate and the CF mother substrate of the mother panel is reduced compared to the present mother panel, which eases the process of separating the corresponding end portion of the CF mother substrate by the splitting device. Specifically, as shown in FIG. 8, the manufacturing method includes the following steps:

Step S100, providing a TFT mother substrate having a first main area and a voltage-applying area and processing the first main area and the voltage-applying area to form a number of thin film transistor substrates on the first main area and form a number of terminals connected to external circuits on the voltage-applying area. In the embodiment, after the film-coated process, photoresist-coated process, photo masking process, developing process, and etching process, a number of thin film transistor substrates arranged as a matrix are formed on the first main area. Each thin film transistor substrate includes a displaying area and a terminal area. The displaying area is used for driving the liquid crystal layer to allow for displays of images and the terminal area is connected to external circuits. The terminal areas of the thin film transistor substrates in the same row respectively correspond to the same sides of the displaying areas. The terminal areas of thin film transistor substrates in two adjacent rows are opposite to each other. The voltage-applying area 120 is located outside the first main area 110 and is configured with a number of terminals 121 onto which the voltage is applied for realizing alignments of the liquid crystals.

Step S110, providing a CF mother substrate having a second main area and an end portion and processing the second main area and the end portion to form a number of color filter substrates on the second main area and a pressure-reduction member on the end portion for reducing the adsorptive force between the voltage-applying area and the end portion. In the embodiment, after the film-coated process, photoresist-coated process, photo masking process, developing process, and etching process, a number of color filter substrates are formed on the second main area. Each color filter substrate 211 forms a black matrix, photo spacers, and a color filter formed in the black matrix. The color filter substrates 211 respectively correspond to the thin film transistor substrates on the first main area 110 to form a number of liquid crystal cells. The end portion 220 is located outside the second main area 210 and corresponds to the voltage-applying area 120 of the TFT mother substrate 100. The pressure-reduction member is arranged on a surface of the end portion for reducing the adsorptive force between the end portion and the voltage-applying area.

Figure 10:
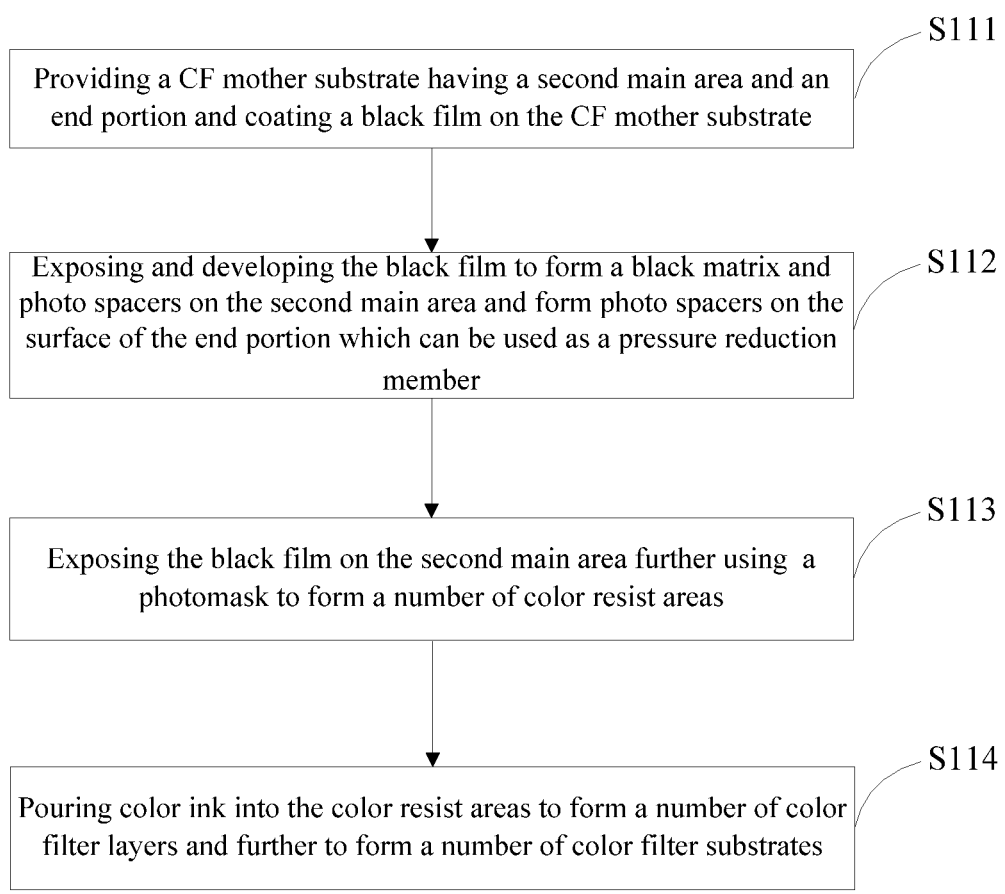
FIG. 10 is a detailed flow chart of the step of forming a CF mother substrate of the manufacturing method of FIG. 9.

Specifically, as shown in FIG. 10, in the embodiment, the step S110 includes:

Step S111, providing a CF mother substrate having a second main area and an end portion and coating a black film on the CF mother substrate.

Step S112, exposing and developing the black film to form a black matrix and photo spacers on the second main area and form photo spacers on the surface of the end portion which can be used as a pressure-reduction member.

Step S113, exposing the black film on the second main area further using a photomask to form a number of color resist areas.

Step S114, pouring color ink into the color resist areas to form a number of color filter layers and further to form a number of color filter substrates.

Therefore, after the step S110, a number of photo spacers each which has a height ranging from 3 um to 5 um are formed on the surface of the end portion of the CF mother substrate, which increases a surface roughness of the end portion and avoids a vacuum state formed between the end portion of the CF mother substrate and the voltage-applying area of the TFT mother substrate. Thus, the adsorptive force generated between the end portion and the voltage-applying area can be reduced to improve the cutting success rate and cutting efficiency of the mother panel and improve the efficiency of the alignment process of the liquid crystal panel. In some embodiments, the photo spacers are evenly arranged on the surface of the end portion. It is understood that the photo spacers on the surface of the end portion are simultaneously formed in the manufacturing process of the photo spacers on the second main area, and the density of the photo spacers on the end portion is equal to that of the photo spacers on the second main area.

Step S120, bonding the TFT mother substrate and the CF mother substrate and pouring liquid crystals into the space defined between the TFT mother substrate and CF mother substrate. After the TFT mother substrate is bonded to the CF mother substrate, liquid crystals are poured into the sealed space formed between the TFT mother substrate and the CF mother substrate to realize the displaying function of the mother panel.

By processing the end portion of the CF mother substrate to form the pressure-reduction member on the surface of the end portion, the manufacturing method of the mother panel provided in the present disclosure increases the surface roughness of the end portion, which avoids a vacuum state formed between the TFT mother substrate and the CF mother substrate after the TFT mother substrate and the CF mother substrate are bonded together, thereby reducing the adsorptive force between the end portion and the voltage applying area. Therefore, when cutting the mother panel, the splitting device is capable of separating the end portion from the TFT mother substrate to improve the cutting efficiency of the mother panel 10. Additionally, since the pressure-reduction member is simultaneously formed in the manufacturing process of the photo spacers on the second main area of the CF mother substrate, allowing the objective of the present disclosure to be achieved at low cost.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A to-be-cut liquid crystal mother panel, comprising:
   a TFT mother substrate forming at least one voltage-applying area onto which an external voltage is applied;
   a CF mother substrate arranged corresponding to the TFT mother substrate; and
   a pressure-reduction member located between the CF mother substrate and the TFT mother substrate, the pressure-reduction member contacting the voltage-applying area and an end portion of the CF mother substrate directly for reducing an adsorptive force generated between the voltage-applying area and the end portion.

2. The liquid crystal mother panel as claimed in claim 1, wherein the pressure-reduction member is arranged on one side of the CF mother substrate facing the TFT mother substrate and is located on the end portion of the CF mother substrate corresponding to the voltage-applying area.

3. The liquid crystal mother panel as claimed in claim 2, wherein the pressure-reduction member comprises at least one protrusion spaced apart from each other.

4. The liquid crystal mother panel as claimed in claim 3, wherein each of the at least one protrusion is a photo spacer.

5. The liquid crystal mother panel as claimed in claim 4, wherein a height of the photo spacer ranges from 3 um to 5 um.

6. The liquid crystal mother panel as claimed in claim 4, wherein the photo spacer is formed in the manufacturing process of photo spacers of the CF mother substrate.

7. A manufacturing method of a to-be-cut liquid crystal mother panel, comprising:

providing a TFT mother substrate having a first main area and a voltage-applying area and processing the first main area and the voltage-applying area to form a plurality of thin film transistor substrates on the first main area and to form a plurality of terminals for external electrical connection on the voltage-applying area;

providing a CF mother substrate having a second main area and an end portion and processing the second main area and the end portion to form a plurality of color filter substrates on the second main area and to form a pressure-reduction member on a surface of the end portion to contact one of the plurality of terminals to be located between the end portion and the voltage-applying area for reducing an adsorptive force generated between the voltage-applying area and the end portion; and bonding the TFT mother substrate and the CF mother substrate and pouring liquid crystals into a space defined between the TFT mother substrate and the CF mother substrate.

8. The manufacturing method as claimed in claim 7, wherein the step of providing a CF mother substrate comprises:

providing the CF mother substrate having the second main area and the end portion and coating a black film on a surface of the CF mother substrate;

exposing and developing a black film to form a black matrix and photo spacers on a surface of the second main area and form photo spacers on a surface of the end portion;

exposing the black thin film on the second main area further using a photomask to form color resist areas; and pouring color ink into the color resist areas to form a plurality of color filter layers and further to form a plurality of color filter substrates on the second main area.

9. The manufacturing method as claimed in claim 8, wherein a height of each photo spacer ranges from 3 um to 5 um.

10. The manufacturing method as claimed in claim 8, wherein a density of the photo spacers on the end portion is equal to that of the photo spacers on the second main area.

11. A to-be-cut liquid crystal mother panel, comprising:
    a TFT mother substrate forming at least one voltage-applying area onto which an external voltage is applied;
    a CF mother substrate arranged corresponding to the TFT mother substrate, the CF mother substrate having an end portion corresponding to the voltage-applying area; and
    a pressure-reduction member arranged on the end portion to contact one of the plurality of terminals directly to be located between the end portion and the voltage-applying area and being formed in the manufacturing process of the CF mother substrate for reducing an adsorptive force generated between the voltage-applying area and the end portion.

12. The liquid crystal mother panel as claimed in claim 11, wherein a height of the pressure-reduction member ranges from 3 um to 5 um.

13. The liquid crystal mother panel as claimed in claim 12, wherein the pressure-reduction member comprises a plurality of photo spacers.

* * * * *